UNITED STATES PATENT OFFICE.

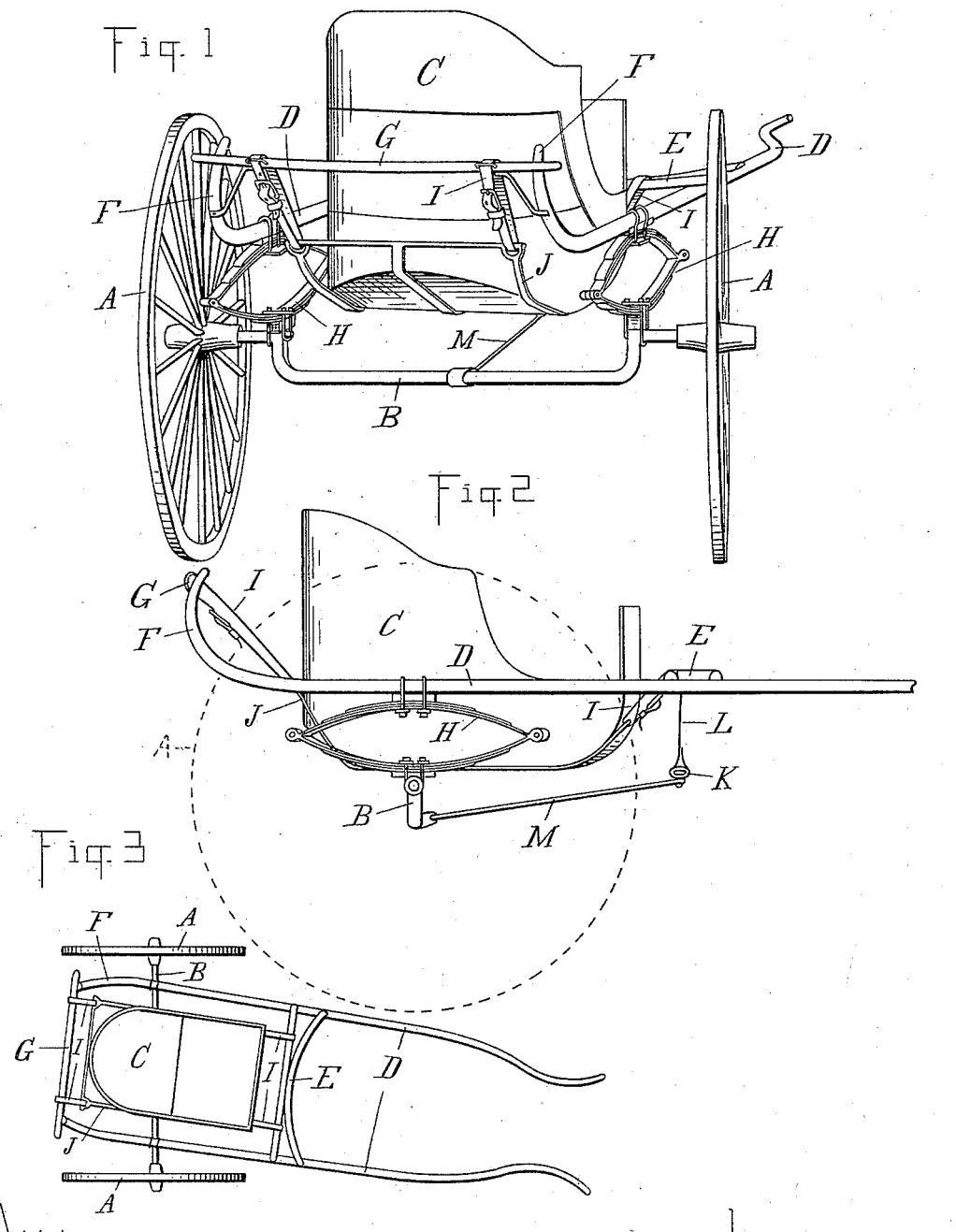

SETH C. FELT, OF NEW BOSTON, MICHIGAN.

ROAD-CART.

SPECIFICATION forming part of Letters Patent No. 398,242, dated February 19, 1889.

Application filed November 21, 1888. Serial No. 291,481. (No model.)

*To all whom it may concern:*

Be it known that I, SETH C. FELT, a citizen of the United States, residing at New Boston, in the county of Wayne and State of Michigan, have invented certain new and useful Improvements in Road-Carts, of which the following is a specification, reference being had therein to the accompanying drawings.

This invention relates to new and useful improvements in two-wheeled vehicles; and the invention consists in the peculiar construction, arrangement, and combination of the various parts, whereby an easy-riding and substantial vehicle is obtained especially adapted for rough country roads, and, further, in the peculiar arrangement of the shaft in connection with the axle and wheels, whereby the horse is made to travel in front or to one side of the tread of the vehicle, all as more fully hereinafter described.

In the drawings which accompany this specification, Figure 1 is a rear perspective view of a vehicle embodying my invention. Fig. 2 is a side elevation, and Fig. 3 is a plan view thereof.

A are the wheels supporting the axle B, preferably of the type known as "crank-axle," as shown, with a depressed middle portion.

C is the body.

D are the shafts. These shafts are connected by one or more cross-bars, E, forward of the body, and extend rearwardly into the upturned rear extension, F, the upper ends of such extension being connected by the rear cross-bar, G.

H are elliptical springs clipped to the straight portion of the axle on their lower side and to the shafts on their upper side.

The body C is supported upon the forward and rear cross-bars by means of the flexible straps or thorough-braces I, secured in front and rear in the eyes of the metallic straps J, secured to the under side of the body in any suitable manner.

K is the whiffletree supported by the strap L below the cross-bar and pivotally connected with the draft-rod M in any suitable manner, the rear end of this draft-rod being secured to the axle, preferably at its middle, in any suitable manner. By this construction it will be seen that the draft is applied directly to the axle, the shafts supporting the body entirely independent of the draft, and the weight of the body C and the driver is brought directly upon the axle. The horse-motion in the body C is taken up by the supports of the shafts upon the springs, and the flexible connections, front and rear upon the cross-bars, allow of a limited free play, which greatly adds to the comfort of the occupant upon rough roads.

It is evident that other styles of springs may be used, such as a half or a three-quarter elliptical spring, and the same results achieved as by the style of spring shown.

I preferably secure the springs upon the axle at an angle to the tread of the wheels, instead of parallel thereto, and to secure the shafts upon the springs at the same angle as the axle to the springs. By this arrangement the path of the horse is at an angle to the path of the wheels, the result of such construction being that when the horse is in the beaten path of a country road the wheels ride out of the ruts or track, and when the wheels are riding in the wheel-tracks the horse is at one side of the track. The advantages of this for rough country roads are so well known as to need no further description.

It is obvious that the shafts may be as well attached in the line of the tread of the vehicle as at an angle thereto, and that in order to change the direction of the draft it is simply necessary to clip the springs upon the axle at the desired angle thereto. My construction readily admits of this change by simply loosening the clip-bolt nuts, turning the springs and shafts at the desired angle, and then again tightening these nuts.

What I claim as my invention is—

1. In a two-wheeled vehicle, the combination of the shafts having front and rear cross-bars, the body suspended between springs connecting the shafts and axle, and direct draft connections to the axle, substantially as described.

2. In a two-wheeled vehicle, the combination of the shafts having an upward and rearward extension and connected by front and rear cross-bars, a body suspended by thorough-braces upon said cross-bars, elliptical springs connecting the shaft and axle, a whiffletree suspended from the forward cross-bar, and a draft-bar connecting the whiffletree and the axle, substantially as described.

3. In a two-wheeled vehicle, the combination of the wheels connected by a crank-axle, springs clipped thereon at the straight end portions thereof at an angle to the line of draft, and shafts and a body supported upon said springs parallel therewith, substantially as and for the purpose described.

4. In a two-wheeled vehicle, the combination of the shafts D, having the upward and rearward extension F, the cross-bars E and G, the springs H, secured to the axle at an angle with the line of draft, the body C, the thorough-braces I, metallic straps J, whiffletree K, strap L, and draft-rod M, the parts being arranged to operate substantially as described.

In testimony whereof I affix my signature, in presence of two witnesses, this 13th day of November, 1888.

SETH C. FELT.

Witnesses:
J. PAUL MAYER,
P. M. HULBERT.